United States Patent [19]

Browell et al.

[11] 3,715,294

[45] Feb. 6, 1973

[54] PHOTOCHEMICAL PROCESS

[75] Inventors: George L. Browell, Mount Lebanon Township, Allegheny County; Leon W. Wilson, Jr., Monroeville, both of Pa.

[73] Assignee: United States Steel Corporation, Pittsburgh, Pa.

[22] Filed: Aug. 10, 1970

[21] Appl. No.: 62,720

[52] U.S. Cl. ............204/163 R, 204/157.1, 204/158, 204/162 R, 204/193
[51] Int. Cl. ........C07c 25/04, B01j 1/10, B01l 11/00
[58] Field of Search ......204/163 R, 163 BH, 163 SH, 204/162 R, 162 SH, 157.1 R, 162 N, 158 R, 193

[56] References Cited

UNITED STATES PATENTS

| | | | |
|---|---|---|---|
| 2,683,688 | 7/1954 | Tramm et al. | 204/163 R |
| 2,811,486 | 10/1957 | Reynolds et al. | 204/163 BH |
| 3,309,298 | 3/1967 | Yoshikazu Ito et al. | 204/193 |
| 3,398,073 | 8/1968 | Geacintov et al. | 204/162 R |
| 3,431,188 | 3/1969 | Shoichi Ito et al. | 204/163 R |
| 3,458,418 | 7/1969 | Beckmann | 204/163 |

*Primary Examiner*—Carl D. Quarforth
*Assistant Examiner*—Roger S. Gaither
*Attorney*—Gene Harsh

[57] ABSTRACT

An acidified aqueous solution of copper sulfate is used as a combination coolant-ultraviolet light filter in a process for the photochlorination of alkyl-aryl compounds.

5 Claims, No Drawings

PHOTOCHEMICAL PROCESS

BACKGROUND OF THE INVENTION

In the existing alkyl-aryl photochlorination processes, an alkyl-aryl compound and chlorine are irradiated with light, usually from mercury arc lamps. The lamps are placed in the center of a chlorination reactor and surrounded with, but isolated from the reaction medium, and the medium is protected from the lamps' intense heat. This is usually accomplished by inserting the lamps into double-walled immersion wells through which a coolant can be circulated.

These processes, as currently conducted, have certain deficiencies. The high energy short wave length light emitted by the mercury arc lamps promotes secondary photochemical reactions that in turn are responsible for the formation of a brown colored film on the exterior surface of the immersion wells. Heavy accumulations of this brown colored substance reduce the intensity of the light and, as a consequence, the immersion wells have to be removed and cleaned. In some cases the brown colored substance contaminates the reaction medium itself. This results in a loss of production time, and in lower yields.

It is therefore, an object of the present invention to reduce the production-down time, and thus increase the economic attractiveness of the photochlorination process.

It is a further object of this invention to provide a combination coolant-light filter for use in the photochlorination of alkyl-aryl compounds.

SUMMARY OF THE INVENTION

In our novel method a coolant-filter zone is interposed between a light source and the solution of alkyl-aryl compound to be irradiated. Our combination coolant-filter takes the place of the conventional water coolant used in photochlorination processes and has the advantage of providing in a single zone a filter as well as coolant.

The reaction medium must be protected from the high energy shorter wave lengths of light (below about 3,000 A) and also from the intense heat of the light source. We have discovered that an acidified aqueous solution of copper sulfate will serve as a means to cool the solution as well as to filter unwanted wave lengths of light. There are several other inorganic salts, such as chrome alum ($CrK(SO_4)_2 \cdot 12H_2O$), cobalt sulfate ($CoSO_4 \cdot 7H_2O$) and potassium chromate ($K_2CrO_4$), and several organic compounds, such as carbon tetrachloride ($CCl_4$), potassium acid phthalate ($KHC_3H_4O_4$) and naphthalene in isooctane, that were found to filter out high energy wave length light. However, these compounds have the disadvantage of either filtering out other wave lengths, thus lowering the efficiency of the process, or of not being water soluble, forcing the use of a separate aqueous cooling zone, or the use of an inconvenient, expensive solvent for the light-absorbing filter material. Surprisingly, we have found that only copper sulfate is free from these disadvantages.

As a result of using our novel aqueous acidified copper sulfate coolant-filter, the secondary photochemical reactions that occur in the absence of the light filtering solution are eliminated or reduced to a negligible degree. Thus, the brown film of an insoluble high molecular weight substance, probably a highly chlorinated polymer, which always is produced when an unfiltered mercury arc light source is used and which fouls the well of the reaction chamber and contaminates the reaction medium as a result of these secondary reactions, is eliminated when our novel coolant-filter solution is used.

DETAILED DESCRIPTION

Any suitable alkyl-aryl compound may be photochlorinated using our process. This compound will have the general formula:

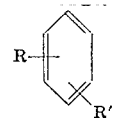

where R is hydrogen or an alkyl group containing from one to five carbon atoms and R' is an alkyl group containing from one to five carbon atoms. Specific examples of suitable compounds are toluene, ethyl benzene, n-propyl benzene, isopropyl benzene, butyl benzene, sec-butyl benzene, tert-butyl benzene, pentyl benzene, (2-pentyl) benzene, o-xylene, m-xylene, p-xylene, 1,2 dimethyl-4-ethyl benzene, 1,3 dimethyl-5-ethyl benzene, 1,4 dimethyl-2-ethyl benzene, 2,4 dimethyl-1-ethyl benzene, 1,2,3 trimethyl benzene, 1,2,4 trimethyl benzene, 1,3,5 trimethyl benzene, 1,2,3,4 tetramethyl benzene, 1,2,3,5 tetramethyl benzene, 1,2,4,5 tetramethyl benzene, etc.

As many widely different ranges of coolant-filter concentration and solution thickness may be used, we do not want to be limited to the specific ranges stated below.

The effective concentration of the copper sulfate solution is somewhat dependent on the intensity of the lamps and the width of the solution between the light source and the compound to be photochlorinated. For example, at any given concentration of copper sulfate, as the intensity of the lamps is increased, the depth of solution has to be increased to maintain effective removal of the high energy levels of light and vice versa when the lamp intensity is decreased. Thus, with standard lamp intensities (e.g. approximately 2,000 watts), a 0.4 molar, 5.0 cm thick copper sulfate solution will filter out light wave lengths below about 3,100 A and above about 6,000 A. A 0.5 molar, 1 cm thick copper sulfate solution filters wave lengths below about 3,000 A and above about 6,500 A. In the practice of our invention, any combination of lamp intensities, solution concentration and solution thickness may be chosen provided only that light wave lengths below about 3,000 A are filtered out. The size of lamps and their immersion wells will also be dependent on the production rate desired. Therefore, the concentration of copper sulfate required to effectively remove the shorter wave lengths or high energy light would vary with the reactor size. For the most of the commercially available photochemical lamps and their immersion wells, a concentration of copper sulfate from about 0.01 molar to about 2.0 molar, preferably from about 0.1 to about 0.4 molar, would be satisfactory and this would be for a range of solution thickness of from about 2 centimeters to about 3 centimeters. Copper sulfate is readily soluble in water and therefore can also function as a coolant for the lamps. It effectively prevents the formation of a brown film on the exterior walls of the immersion wells without interfering with the principal chlorination reaction. Use of acidified copper sulfate solutions does not require any changes in equipment or operating procedure. In practice, it would simply replace the water that is ordinarily used to cool the lamps.

It is necessary to acidify the solution to prevent hydrolysis and the formation of a basic copper sulfate precipitate which would cloud the coolant-filter solution and decrease the efficiency of the cell. Any suitable acid may be employed, as for instance sulfuric or hydrochloric acid, in a quantity sufficient to lower the pH to below 7, preferably to from about pH 1 to about pH 4. Sulfuric acid is preferred because it has the sulfate anion in common with the copper sulfate.

The following examples are presented to illustrate specific embodiments of our invention and are not meant to be limiting.

EXAMPLE 1

A three necked glass kettle reactor fitted with a thermometer and combination reflux condenser and chlorine sparge is filled with 2,750 ml (26.0 moles) of toluene and heated to reflux with a heating mantle. A Hanovia L679A 450 watt high pressure mercury arc lamp is placed in the center of the reactor in a quartz, double-walled immersion well. The space between the inner and outer walls of the immersion well, a distance of 0.5 centimeter, is filled with circulating water. The lamp is turned on and the chlorine is sparged into the reactor at the rate of 2,750 ml per minute for a period of 88 minutes. The benzyl chloride product is very yellow in color and the wall of the immersion well facing the light source is covered with a dense brown film.

EXAMPLE 2

Example 1 is repeated except that the water coolant is replaced with a 0.4 molar copper sulfate solution acidified to pH 1 to 2 with sulfuric acid. The benzyl chloride product is colorless and the wall of the immersion well facing the light source is free of any film.

EXAMPLE 3

Chlorine, at a flow rate of 1,760 milliliters per minute is sparged into a kettle reactor containing 2,500 milliliters of refluxing toluene, to which fresh toluene is added at a rate of 41 milliliters per minute while product is withdrawn at the same rate. The solution is irradiated with a 450 watt high pressure mercury arc lamp placed in a double-walled, quartz immersion well in the center of the reactor. The distance between the walls in the coolant-filter zone of the immersion well is 0.5 centimeter. A 0.4 molar copper sulfate solution acidified to pH 1 to 2 with sulfuric acid is circulated through the immersion well. The product obtained during a 9-hour reaction period is colorless and the exterior wall of the immersion well is free of film.

The above examples are given for illustration only and are not intended to be limiting. We intend to be limited only by the appended claims.

We claim:
1. In a process of the chlorination of alkyl-aryl compounds by photochemical means wherein the alkyl-aryl compound is sparged with chlorine while being irradiated with energy from a light source, the improvement comprising interposing between said light source and the compound to be chlorinated, a combination coolant-ultraviolet light filter zone comprising aqueous acidified solution of copper sulfate such that light wave lengths below about 3,000 A are filtered out.

2. The process of claim 1 wherein the combination coolant-ultraviolet light filter zone is from about 2 to about 3 centimeters wide and the concentration of the copper sulfate solution is from about 0.01 to about 2.0 molar.

3. The process of claim 2 wherein the pH of the copper sulfate solution is from about 1 to about 2.

4. The process of claim 3 wherein the concentration of the copper sulfate solution is from about 0.1 to about 0.4 molar.

5. The process of claim 3 wherein the alkyl-aryl compound is toluene.

* * * * *